United States Patent [19]
Clark et al.

[11] Patent Number: 5,754,664
[45] Date of Patent: May 19, 1998

[54] VEHICLE AUDIO SYSTEM

[75] Inventors: David L. Clark, Northville; John W. Steuber, Holland, both of Mich.

[73] Assignee: Prince Corporation, Holland, Mich.

[21] Appl. No.: 283,680

[22] Filed: Aug. 1, 1994

Related U.S. Application Data

[63] Continuation of Ser. No. 119,494, Sep. 9, 1993, abandoned.

[51] Int. Cl.⁶ .................................................. H04B 1/00
[52] U.S. Cl. .......................... 381/86; 381/24; 296/214
[58] Field of Search .......................... 381/86, 188, 205, 381/24; 296/214; 181/199, 141, 144, 170, 171

[56] References Cited

U.S. PATENT DOCUMENTS

| | | | |
|---|---|---|---|
| 1,930,577 | 10/1933 | Atkinson | 381/86 |
| 2,060,666 | 11/1936 | Ellmore . | |
| 2,069,328 | 2/1937 | Rockwell . | |
| 3,158,835 | 11/1964 | Hipkins . | |
| 4,005,761 | 2/1977 | Okamoto et al. | 181/141 |
| 4,056,165 | 11/1977 | Okamoto et al. | 181/141 |
| 4,132,859 | 1/1979 | Ranga . | |
| 4,256,797 | 3/1981 | Stamper et al. | 428/215 |
| 4,329,544 | 5/1982 | Yamada . | |
| 4,358,883 | 11/1982 | Gerring | 296/214 |
| 4,594,729 | 6/1986 | Weingartner | 381/18 |
| 4,673,056 | 6/1987 | Koppelomäki | 381/86 |
| 4,703,502 | 10/1987 | Kasai et al. | 381/24 |
| 4,769,843 | 9/1988 | Imai et al. | 381/24 |
| 4,828,910 | 5/1989 | Haussling | 428/284 |
| 4,924,962 | 5/1990 | Terai et al. | 181/141 |
| 4,953,213 | 8/1990 | Tasaki et al. | 381/24 |
| 4,953,219 | 8/1990 | Kasai et al. | 381/86 |
| 4,968,154 | 11/1990 | Baeg | 381/18 |
| 4,972,489 | 11/1990 | Oki et al. | 381/97 |
| 5,016,934 | 5/1991 | Pelz . | |
| 5,129,004 | 7/1992 | Imai et al. | 381/86 |
| 5,155,770 | 10/1992 | Maejima | 381/18 |
| 5,172,415 | 12/1992 | Fosgate | 381/22 |
| 5,280,991 | 1/1994 | Weiland . | |
| 5,481,618 | 1/1996 | Ross et al. | 381/205 |

FOREIGN PATENT DOCUMENTS

| | | |
|---|---|---|
| 3603198 | 10/1986 | Germany . |
| 0671885 | 10/1964 | Italy ........................ 381/86 |
| 497697 | 8/1990 | Japan . |
| 497699 | 3/1992 | Japan . |
| 497700 | 3/1992 | Japan . |
| 4114600 | 4/1992 | Japan . |
| 1555409 | 11/1979 | United Kingdom . |
| 2134464 | 8/1984 | United Kingdom . |

*Primary Examiner*—Curtis Kuntz
*Assistant Examiner*—Ping W. Lee
*Attorney, Agent, or Firm*—Price, Heneveld, Cooper, DeWitt & Litton

[57] ABSTRACT

A vehicle audio system includes overhead speakers connected to an audio source through a control circuit. The control circuit effects signal delays, crossover filtering, and equalization. The overhead speakers are connected to the control circuit and are positioned such that they provide strong front staging and desired surrounding ambiance responsive to the output signals of the control circuit. According to one aspect of the invention, the speakers are mounted directly to the headliner.

41 Claims, 4 Drawing Sheets

VEHICLE AUDIO SYSTEM

This is a continuation of application Ser. No. 08/119,494 filed on Sep. 9, 1993, now abandoned.

BACKGROUND OF THE INVENTION

The invention relates to vehicle audio systems, and more particularly, to a vehicle audio system presenting strong front staging while providing surrounding ambience simulating a listening area substantially larger than that of the interior of a vehicle.

In the past, designers have produced auditorium, church, etc. ambient characteristics in small areas such as household rooms by providing a plurality of spaced speakers and subjecting audio signals supplied to each of the speakers with a controllable time delay before being reproduced by each speaker in the system. By selecting an appropriate position for the speakers, and subjecting the signals input to the speakers to a respective delay, the audio system simulates sound imaging of a larger area than the room in which the speakers are positioned. Although it is desirable to provide such audio imaging in a vehicle, because of the particularly small volume of a vehicle interior and the limited availability of speaker locations, it is very difficult to simulate the acoustic image of an auditorium, a church, or even a room of a house, in a vehicle. It is also difficult to produce high quality sound in vehicles because of the high ambient noise levels which are present when a vehicle is traveling at high speeds or in heavy traffic.

In an attempt to overcome these difficulties, audio system designers and vehicle manufacturers have proposed and implemented a variety of audio systems for vehicles. One proposed system includes speakers mounted in the instrument panel, and more particularly, at the right, left and center of the instrument panel. This system, as well as other systems, includes speakers in the rear doors and at the rear of the center console. Also the rear window ledge has provided a popular speaker mounting location including one for mounting sub-woofers. These speaker locations are used in an attempt to present a suitable front staging effect for both front and rear seat passengers. Although the center mounted front speakers are positioned such that they produce a suitable audio image, it is difficult to access the center position of the instrument panel. Accordingly, not only are these center instrument panel speakers difficult to install, it is very difficult to perform any maintenance on the speakers.

For the rear seat passengers, the door and console speakers are not at an adequate height for medium and high frequency audio signals. Speakers located in the door are muffled by carpeting and passengers sitting next to the doors. Additionally, it is difficult to mount the speakers in a door or center console such that they can effectively transmit high frequency sound at the ear level of listeners. This problem is particularly difficult to overcome due to the directionality of high frequency audio signals. Thus, it has been particularly difficult to effectively position the speakers for rear seat passengers and generate desirable staging and ambient imaging for all the passengers in a vehicle. Furthermore, it is considered by some to be more important to provide a desired audio ambience in the rear seat because owners of expensive vehicles often ride in the rear seat of the vehicle. Thus, known audio systems have not effectively implemented front staging and surrounding ambience.

Considerable effort continues in the development of vehicle audio systems providing improved listening pleasure for passengers in the vehicle. Nevertheless, despite the fact that it has been known to provide a speaker mounted to the vehicle roof structure, audio system designers have not recognized the advantages of providing a speaker array in the vehicle roof area for effecting front staging and desired ambient characteristics. This is in part believed to be due to the difficulty in mounting speakers to the vehicle roof structure. Additionally, those skilled in the art mount speakers to rigid panels, whereas a headliner is flexible. Hence, audio experts would not be led to mount a speaker in a headliner. Accordingly, despite the variety of different solutions to the audio staging problem, it remains desirable to provide an audio system which is both easy to install and provides strong front staging with effective audio imaging in the limited confines of a vehicle interior.

SUMMARY OF THE INVENTION

The present invention overcomes the problems of the prior art by providing a system for a vehicle including overhead speakers. The overhead speakers may advantageously be mounted in a headliner such that the speakers are easier to install than speakers used in other systems and still provide both strong front staging and excellent surrounding ambience performance.

According to one aspect of the invention, a vehicle audio system uses a headliner supported on the vehicle roof structure and a source of audio signals. At least one speaker is coupled to the audio source and mounted directly to the headliner whereby the headliner supports the speaker adjacent the roof structure of the vehicle.

According to another aspect of the invention, the vehicle headliner for mounting to the roof structure of the vehicle includes a headliner body. A plurality of speakers, adapted to be coupled to an audio source, are mounted to the headliner body such that they are positioned adjacent the roof structure of the vehicle when the headliner is mounted in the vehicle.

According to yet another aspect of the invention, the audio system includes a speaker coupled to the audio source and mounted to a surface of the headliner. The audio system also includes at least one speaker positioned in the vehicle below the headliner. The headliner speaker is a full range speaker and the speaker below the headliner is a woofer or a sub-woofer, whereby the audio system is implemented without the use of a tweeter.

According to still another aspect of the invention, the audio system for a vehicle including a plurality of speakers mounted in spaced relation near the vehicle roof structure. A control circuit is coupled between the audio source and the speakers. The control circuit generates signals for driving the speakers such that the speakers create strong front staging in the vehicle while providing a surrounding audio image simulating a listening area substantially larger than that in the interior of the vehicle.

According to another aspect of the invention, a first headliner speaker is coupled to the audio source and supported at approximately the center of the headliner. A plurality of second headliner speakers are positioned in spaced relation to the first headliner speaker. A control circuit is coupled between the audio source and said first and second speakers. The control circuit generates signals for driving the first and second speakers such that these speakers create strong front staging for passengers in the vehicle while providing a surrounding ambience simulating a listening area substantially larger than that in the interior of the vehicle.

The system according to the invention provides strong front staging for all the occupants of a vehicle while simulating a listening area larger than the interior of the vehicle. Because the speakers are positioned in the headliner of the vehicle, they may be readily positioned at any desired location on the headliner, permitting easy, versatile positioning and installation. The headliner mounted speaker system may be readily provided as a vehicle option by substituting a headliner including speakers for one which does not include speakers. A further advantage of the invention is the volume between the headliner and the roof provides an infinite baffle. The sound quality is also enhanced by the adhesive used to mount the speakers to the headliner, which provides effective isolation between the front and rear of the speakers.

These and other objects, features, and advantages of the invention will become apparent upon reading of the following more detailed description of the preferred embodiment of the invention with reference to the accompanying drawings, in which:

DETAILED DESCRIPTION OF THE PREFERRED EMBODIMENTS

Figure 1:
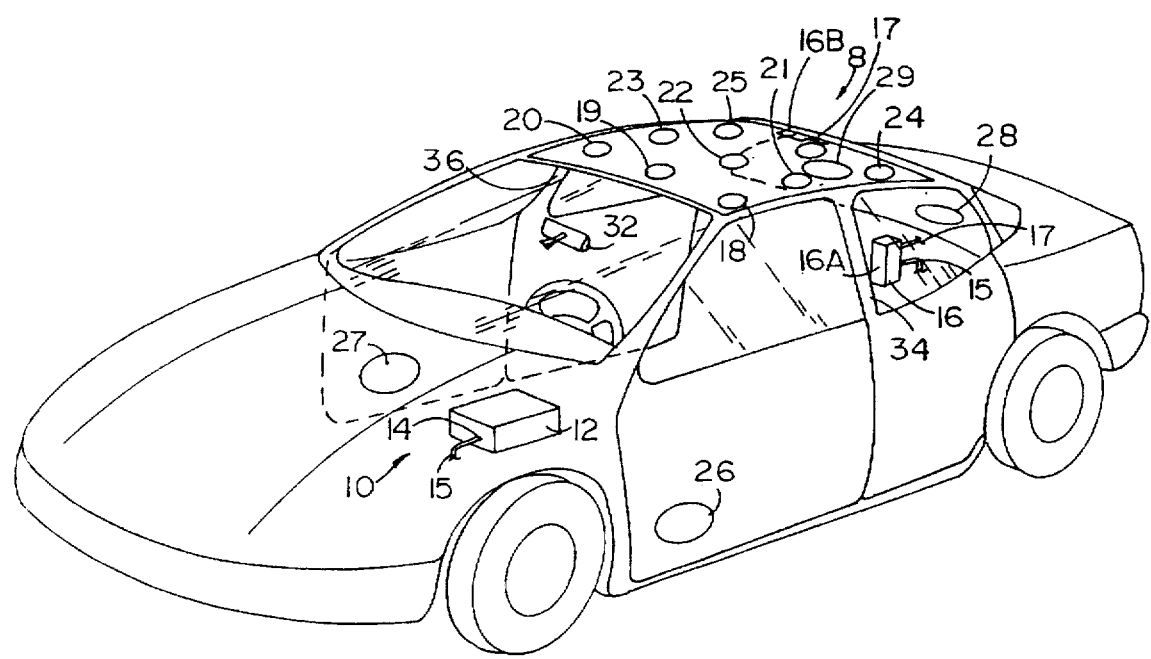
FIG. 1 is a perspective view of a vehicle including an audio system according to the invention.
Figure 2:
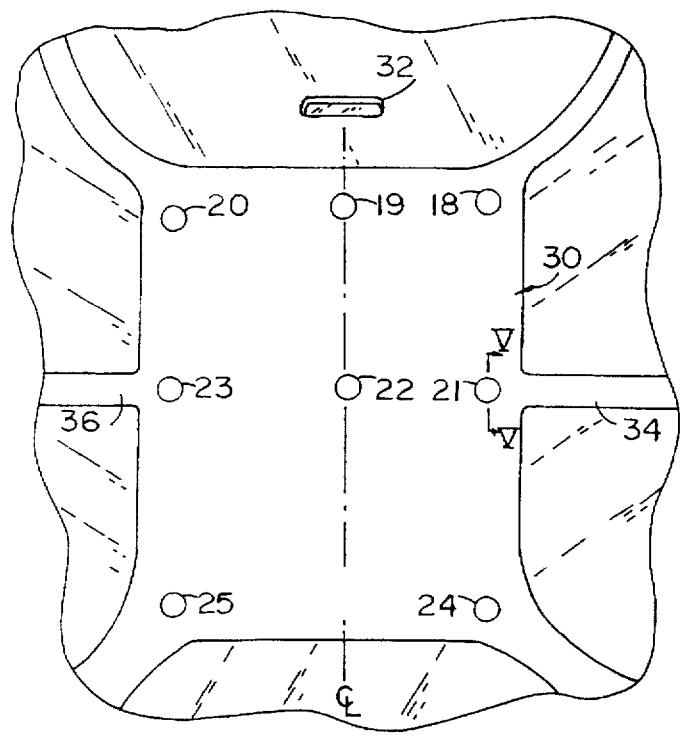
FIG. 2 is a bottom plan view of a headliner in the vehicle according to FIG. 1.
Figure 4:
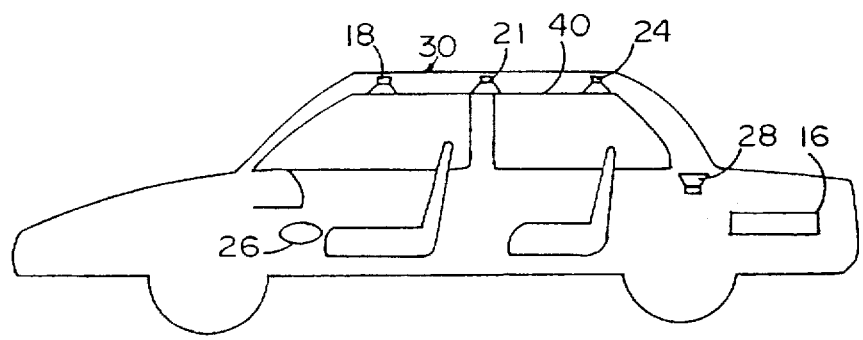
FIG. 4 is a side elevational view of the vehicle including the audio system according to FIG. 1.

A vehicle 8 including an audio system 10 embodying the invention is illustrated in FIG. 1. The audio system 10 includes a commercially available audio source 12, which includes a tuner, a cassette player, a compact disc player, a cellular telephone, any combination thereof, or the like. The audio source 12 may also include amplification circuitry such that the audio source outputs signals at a level which is capable of directly driving speakers. Outputs 14 of the audio source 12 are connected to control circuit 16 by signal conductors 15. The control circuit 16 is an audio electronics module located in the vehicle. The control circuit generates output signals driving speakers 18–29 from the signals output by audio source 12. The outputs of circuit 16 are coupled to speakers 18–29, as described in greater detail hereinbelow. As also described in greater detail hereinbelow, speakers 18–25 are substantially full range speakers supported overhead, and preferably are mounted directly to a vehicle headliner 30 (FIG. 2). Speakers 26 (FIG. 1) and 27 are woofers positioned near the front corners of the vehicle interior, and in one reduction to practice, are mounted in the front door panels (not shown) of the vehicle. However, speakers 26 and 27 may be mounted under the instrument panel or ahead of the front door. Speakers 28 and 29 are sub-woofers positioned in vehicle 8 on the rear package tray behind the rear seats of the vehicle 8, as best shown in FIG. 4.

As mentioned briefly above, speakers 18–25 (FIGS. 1 and 2) are mounted to the vehicle headliner 30. Speaker 18 is mounted at the left front corner of the headliner. Speaker 19 is centrally mounted near the longitudinal axis $C_L$ of headliner 30 and adjacent the front edge of the headliner above the rearview mirror 32. Speaker 20 is mounted to the right front corner of the headliner. Speakers 18–20 are positioned along the front edge of the vehicle headliner to provide strong frontal staging for the occupants of the front and back seats of the vehicle. Speakers 21–23 are positioned across the headliner between the central pillars 34, 36 supporting the vehicle roof. Speaker 21 is mounted to the headliner 30 at a position on the left side above the center pillar 34 and speaker 23 is mounted to the headliner, near the longitudinal center line $C_L$, and at a position on the right side of the headliner above pillar 36. Speaker 22 is mounted to the headliner and positioned approximately at the center of the headliner between speakers 21 and 23. Speakers 21–23 provide strong frontal staging for occupants of the back seat of vehicle 8. Speakers 19 and 22, as described in greater detail herein below, provide a strong center staging image in the front, center of vehicle 8 for the front and rear passengers. Speaker 24 is mounted in the left rear corner of a headliner 30. Speaker 25 is mounted in the right rear corner of the headliner. Speakers 24 and 25 are used with speakers 18, 20, 21 and 23, and control circuit 16, to define the surrounding ambiance in vehicle 8. Each of headliner speakers 18–25 may be provided by any suitable commercially available speaker having a diameter of one to five inches, if round, or sides with a length of one to five inches, if square. Most preferably, the speakers are round, having a diameter of three to three and one-half inches. The speakers have a range of 80 to 20,000 Hz, and most preferably have a range of 150 to 20,000 Hz. However, any suitable full range speaker may be used to implement the invention. In one reduction to practice, speakers 18–25 were implemented using three and one-half inch INFINITY brand speakers.

Figure 3:
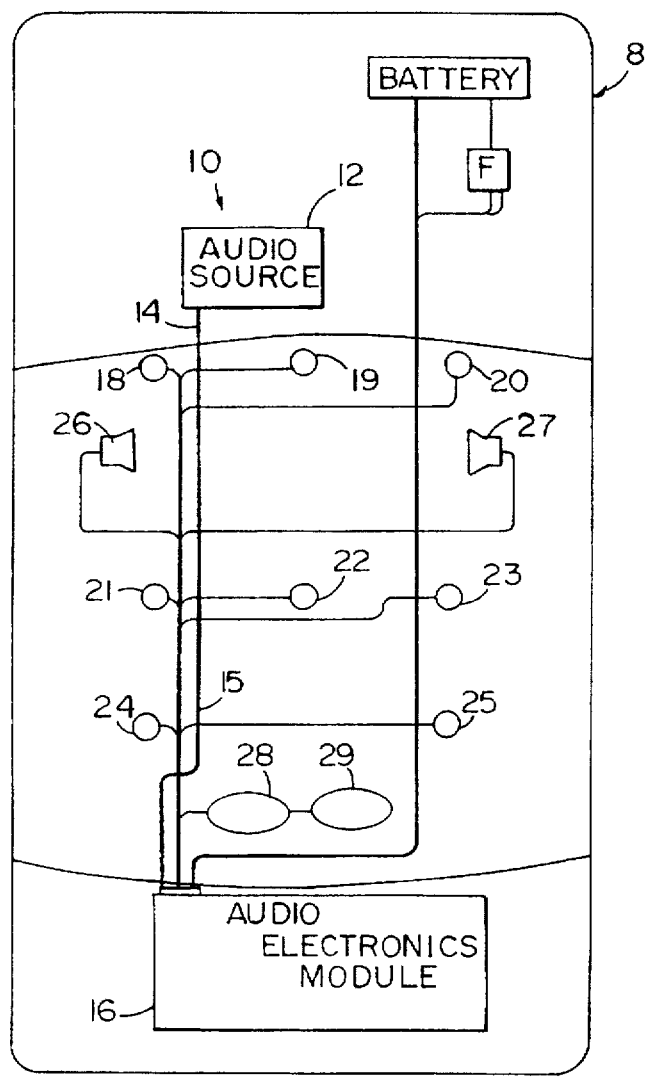
FIG. 3 is a top plan view showing the vehicle and audio system according to FIG. 1.

With reference to FIGS. 1 and 3, speakers 26 and 27 are woofers mounted in the lower front corners of vehicle 8 (FIG. 1). Speakers 26 and 27 are preferably conventional low frequency speakers, although they may be implemented using full range speakers. Speakers 26 and 27 have a diameter of three to seven inches, and most preferably, a diameter of approximately five to five and one-half inches, and are of the type typically mounted in vehicle door panels. Although speakers 26 and 27 preferably do not include a tweeter, the speaker could be implemented using coaxial speakers having a tweeter as is conventionally utilized in the front door panels of vehicles. In a reduction to practice, speakers 26 and 27 are mounted in a vehicle door panel in a conventional manner. However, it is envisioned that these speakers could be mounted in the kick panel in front of the interior of front doors, under the instrument panel pointing downwardly, or at any other suitable position in the front corners of the interior of vehicle 8. Speakers 26 and 27 preferably produce signals in the frequency range of 60 Hz to 5,000 Hz, and most preferably are capable of reproducing audio signals having a frequency of 85 Hz to 3,000 Hz. Speakers 26 and 27 are used to effect frontal staging with the overhead speakers 18–25.

With continued reference to FIG. 1, speakers 28 and 29 are sub-woofers, which produce signals in a frequency range below the frequency range of woofers 26 and 27. The sub-woofers are preferably six by nine oval speakers, which are mounted in an oval opening in the rear package tray. Speakers 28 and 29 are preferably mounted in the openings typically provided in the package tray by the vehicle manufacturer. Any suitable commercially available sub-woofer producing signals below 85 Hz or 60 Hz may be utilized to implement the sub-woofers. It will be appreciated by those skilled in the art that one sub-woofer may be used in place of the dual sub-woofers of the preferred embodiment. Additionally, although the sub-woofers are preferably mounted conventionally in the rear package tray, they may be mounted at any suitable location in the vehicle.

Figure 5:
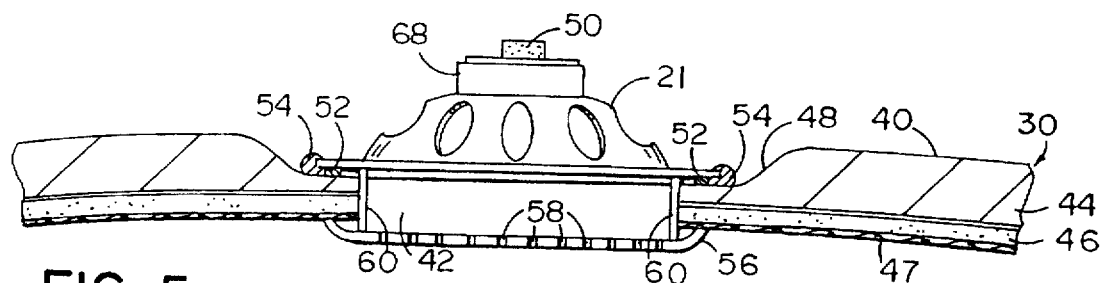
FIG. 5 is an enlarged fragmentary cross-sectional view of a speaker mounted to a headliner taken along plane V—V in FIG. 2.

With reference now to FIGS. 4 and 5, headliner speakers 18-25 are preferably mounted directly to a top surface 40 of headliner 30. According to a preferred embodiment of the invention, speakers 18-25 are positioned adjacent an aperture, such as 42, manufactured into the headliner. Headliner 30 in the illustrated embodiment has a body including a substrate 44, a foam layer 46, and a fabric layer 48 which are constructed in any suitable, conventional manner. However, those skilled in the art will recognize that the speaker may be mounted to any headliner 30. Apertures, such as aperture 42, are cut through the substrate, foam and fabric of headliner 30 by conventional means at each of the locations where speakers are to be mounted when the headliner is manufactured. According to the most preferred embodiment of the invention, the headliner includes recesses, such as 48, at each speaker location. Speakers 18-25 are mounted on substrate surface 40 of the headliner in a recess 48, such that the speakers are spaced from the vehicle roof structure. A foam, or other material, spacer 50 is positioned between each speaker and the vehicle roof to prevent contact between the speakers and the roof, which damage the roof and prevents a decrease in the efficiency of the speakers. To mount the speakers 18-25 to the headliner 30, an adhesive 52 is applied between the speakers and substrate surface 40. The speaker is pressed onto the adhesive 52 and into surface 40 to form a seal between the speaker and substrate 40. Additional adhesive 54 is applied around the speaker after the speaker is attached to the panel. The adhesive may be a commercially available hot melt glue, or other suitable adhesive, which provides a seal between the speaker and the headliner 30. It is important that a bond be created between the speaker and surface 40, around the entire perimeter of speaker 21. If a complete seal is formed, the adhesive creates an air barrier between the speaker and the headliner substrate. Hence, the adhesive securely will affix speakers 18-25 to headliner 30 and effects isolation of the front and back of speaker 21. As will be appreciated, all of the speakers 18-25 are mounted on headliner 30 in a similar manner.

Figures 6, 8:
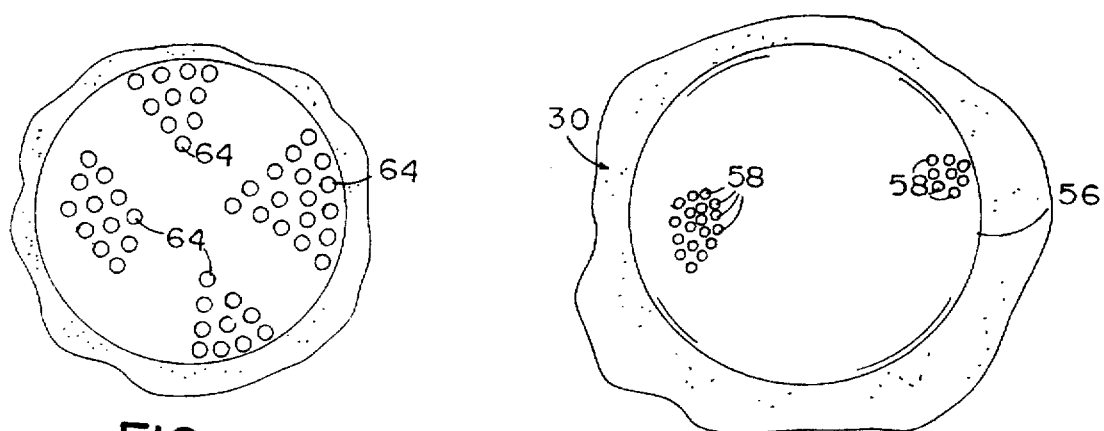
FIG. 6 is a fragmentary bottom plan view of a headliner and grill according to FIG. 5.
FIG. 8 is a fragmentary plan view of a headliner including a speaker mounted according to FIG. 7.

With reference now to FIGS. 5 and 6, the speaker aperture 42 in headliner 30 is covered using a grill 56. The grill includes openings 58 passing audio signals. The grill may be attached to the headliner or speaker using snap-on fasteners 60, a threaded fastener (not shown), an adhesive, or the like. The grill is provided by any suitable, commercially available grill, and may be manufactured using a metal, polymer material, or the like.

Figure 7:
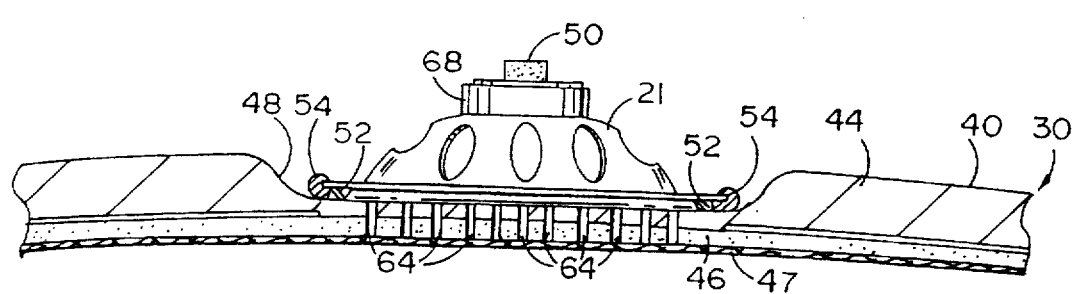
FIG. 7 is an enlarged fragmentary sectional view similar to FIG. 5 showing an alternate embodiment of a headliner mounted speaker.

With reference now to FIGS. 7 and 8, according to an alternate embodiment of the invention, speakers 18-25 are mounted in respective recesses 46 of the headliner substrate 44, as described above. However, the substrate 44 and foam 46 between back surface 40 in recess 46 and fabric 48 are provided with a plurality of small sound passages 64 (only some of which are numbered). The fabric 42 covers these apertures, hiding the speakers. This method of attaching speakers 18-25 is particularly advantageous because the appearance of the headliner is unchanged from those headliners without speakers 18-25, as seen by occupants of the vehicle. Additionally, the speakers are mounted out of view on the headliner without requiring a further manufacturing step of assembling grill 56 to headliner 30 after the speaker is mounted to the headliner. This reduces the manufacturing cost of the headliner. The apertures 64 may optionally extend through fabric 48, as illustrated in FIG. 8.

According to a third embodiment of the invention (not shown), speakers 18-25 are secured to headliner 30 using mounting brackets (not shown). Each speaker is positioned on the top surface 40 of substrate 44 and a mounting plate (not shown) is positioned on the front surface. Threaded fasteners (not shown) are connected to the speaker and mounting plate such that the speaker and mounting bracket are tightened onto headliner 30. This effectively clamps the headliner between the speaker and bracket. A grommet, or adhesive, is preferably positioned between each speaker and the top surface 40 of substrate 44 to effect an air seal therebetween. A grill 56 is connected to the mounting bracket to hide the speakers and mounting bracket.

By mounting speakers 18-25 directly to headliner 30, speakers 18-25 are mounted overhead, and more particularly, at the roof of the vehicle without structurally modifying the vehicle roof. This greatly facilitates the assembly of the speakers to the vehicle as compared to assembling the speaker to a vehicle roof using mounting brackets, welding, or the like. Thus, overhead speakers may be effectively provided at a lower cost. A particular advantage of this invention is that the speaker system may be readily added to vehicles as optional equipment by substituting a preassembled headliner with speakers for one without speakers. The speaker magnets 68 will be magnetically attracted to the roof of the vehicle, such that they will assist in holding the headliner on the roof. The foam spacer 50 prevents the efficiency of the speakers from being lowered by preventing direct contact between the speakers and the roof. Additionally, the space between the headliner and the bracket provides an uninterrupted air volume, and approaches a purely resistive termination, such that the space between the headliner and roof provides frictional surfaces which progressively dissipate sound propagating radially outwardly from each of the speakers mounted to the headliner. This unbaffled air volume thus effects pure, high quality sound reproduction from the speakers mounted in the vehicle headliner.

Figure 9:
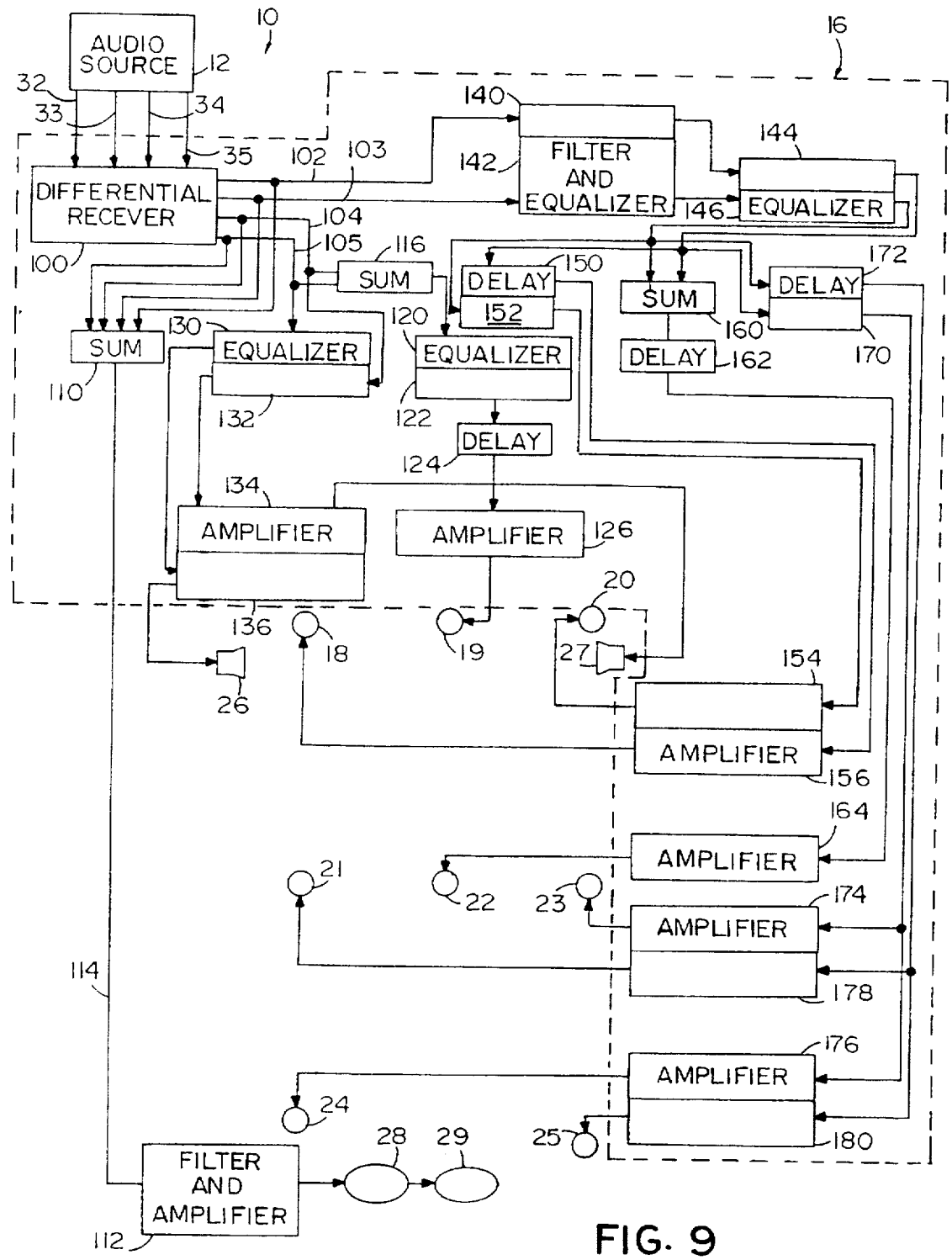
FIG. 9 is a circuit schematic partially in block diagram form, of the audio system according to FIG. 1.

As described briefly above, and with reference now to FIG. 9, audio system 10 includes an audio source 12. The audio source 12 may be provided by any suitable commercially available audio source such as a receiver, a tape player, a CD player, telecommunications equipment such as a cellular telephone, any combination thereof, or the like. Hence, "audio source," as used herein, includes all such devices capable of producing audio signals and their equivalents.

With continued reference to FIG. 9, source 12 is implemented using a audio source having four balanced outputs 32, 33, 34 and 35. The four balanced outputs 32-35 represent left front (LF), right front (RF), left rear (LR), and right rear (RR) signals, respectively. The outputs of the audio source are balanced outputs, such that each output includes two signals having opposite polarities and equal magnitude, as is conventional.

Figure 10:
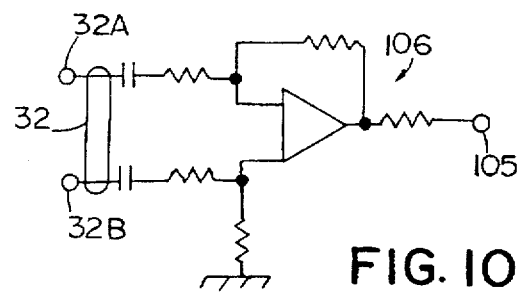
FIG. 10 is a circuit schematic partially in block diagram form of a differential limiter according to the invention.

The balanced outputs 32–35 of audio source 12 are input to control circuit 16. Control circuit 16 includes a differential receiver 100 for converting the balanced outputs 32–35 to single ended outputs 102–105. More particularly, the differential receiver includes four active amplifiers, one of which is 100, shown in FIG. 10, for converting the balanced outputs 32–35 to single ended outputs. Each amplifier 106 is connected to the two conductors 32A, 32B, of an associated balanced output 32. The balanced outputs are input to an operational amplifier through respective resistors and capacitors. The output of the operational amplifier is a single ended signal. As will be recognized, the differential receiver includes a respective amplifier 106 for each balanced output 32–34.

The four single ended outputs 102–105 of differential receiver 100 are connected to a summer 110. Summer 110 is implemented using a conventional passive resistor summing network which combines the four single ended signals at outputs 102–105 into a summation signal. The output of the summation circuit is coupled to a low-pass filter and amplifier circuit 112 through a conductor 114. Circuit 112 includes an active low-pass filter with a cutoff frequency below 100 Hz, and most preferably has a cutoff frequency of 85 Hz or 60 Hz. Circuit 112 also includes a 50 to 150 Watt amplifier, and most preferably, has a 100 Watt amplifier. The output of amplifier 112 is connected to sub-woofers 28 and 29, which are connected in parallel.

The left front (LF) 104 and right front (RF) 105 outputs of circuit 100 are connected to a summer 116. Summer 116 is a passive summer including a resistor network which combines the LF signal 104 and the RF signal 105. The output of the summer is connected to a high-pass filter and equalizer circuit 120. Circuit 120 is a crossover filter and signals below 100 Hz. Circuit 120 preferably has a low frequency cutoff of approximately 150 Hz. Circuit 120 includes filters which are chosen to provide both the crossover filtering and initial speaker frequency equalization for the signal output from summer 116. A second equalization is performed using a triple notch filter equalizer 122. Equalizer 122 includes three independent, active filters which are connected in parallel and have output signals subtracted from the full frequency band output by filter 120 to create notches at the peak output frequencies of speaker 19. The equalizer thus equalizes the frequency response of the speaker by filtering out the peak frequencies of the speaker. Those skilled in the art will recognize that the equalizer circuitry produces a signal which is complementary to the frequency characteristics of speaker 19 throughout the desired frequency range produced using the speaker. Those skilled in the art will also appreciate that equalization circuits and may be readily reduced to practice. The output of equalizer 122 is input to a delay 124. Delay 124 effects a suitable delay of 5 to 15 ms, and in a reduction to practice was 8 milliseconds. The output of delay 124 is input to an amplifier 126. Amplifier 126 is a 10 to 20 Watt amplifier, and is preferably a 16 Watt amplifier. The output of the 16 Watt amplifier is connected to speaker 20, which is the front center headliner speaker.

The LF output 104 and RF output 105 of differential receiver 100 are input to an equalizer 130, 132. Equalizer 130 includes active filters which effect a fixed equalization of the signals input thereto to attenuate the peak output frequencies of speakers 26 and 27, and thus provide a signal having frequency characteristics complementary to the frequency characteristics of speakers 26 and 27. The output of equalizers 130, 132 are input to filter and amplifier circuits 134, 136, respectively. Filter and amplifier circuits 134, 136, each include an active high-pass filter for removing frequencies below 60 Hz, and preferably filters out signals below 80 Hz. Each circuit 134, 136 also includes a 25 to 75 Watt amplifier, and most preferably include a 50 Watt amplifier for each output. The outputs of amplifier circuits 134, 136 are connected to speakers 26 and 27, respectively. Hence, the LF signal is input to speaker 26 and the RF signal is input to speaker 27.

The LR output 102 and the RR output 103 of differential receiver 100 are connected to low-pass filter and equalizer circuits 140, 142. Circuits 140, 142 are identical to filter 120, and include an active low-pass filter for filtering out signals below 100 Hz, and most preferably, have a low frequency cutoff of 150 Hz. The active filter circuit also includes active filter impedances for initial equalization of the signals input to speakers 18 and 20–25. The outputs of circuits 140 and 142 are input to equalizers 144, 146. Equalizers 144, 146 include a triple notch filter identical to equalizer 122 for attenuating the peak frequencies of speakers 18 and 20–25. Equalizers 140, 142 thus include three active filters for effecting filtering complementary to the frequency characteristics of speakers 18 and 20–25.

The outputs of equalizers 144, 146 are connected to delay circuits 150, 152 which effect a five to fifteen millisecond delay. In a reduction to practice, these delays each effected a ten millisecond delay. The outputs of delays 150, 152 are connected to amplifiers 154 and 156. Amplifiers 154, 156 are 10 to 20 Watt amplifiers and most preferably are 16 Watt amplifiers. The outputs of amplifiers 154, 156 are connected to speakers 18 and 20, respectively.

The outputs of equalizers 144, 146 are also connected input to a summer 160, which includes a passive resistor-network for combining these signals. The output of summer 160 is coupled to a delay circuit 162. Delay circuit 162 effects a 0 to 10 millisecond delay and most preferably effects a 5 millisecond delay. The output of delay circuit 162 is connected to an amplifier 164. Amplifier 164 is a 10 to 20 Watt amplifier, and most preferably, is a 16 Watt amplifier. The output of amplifier 164 is connected to speakers 22 such that a sum of the LP and RR signals is input to speaker 22 to present a center stage in the center of the vehicle for passengers in the rear seat.

The outputs of equalizers 144 and 146 are also connected to delay circuits 170, 172. Delay circuits 170 and 172 effect a 10 to 30 millisecond delay, and preferably effect a 20 millisecond delay. The output of delay circuit 170 is connected to amplifiers 174, 176. The output of delay circuit 172 is connected to amplifiers 178, 180. Amplifiers 174, 176, 178 and 180 each include a suitable, conventional amplifier having a gain of 10 to 20 Watts, and most preferably, having a gain of 16 Watts. The outputs of amplifiers 174, 178, 176 and 180 are connected to speakers 21, 23, 24 and 75, respectively, such that the LR signal is input to speakers 21 and 24 and the RR signal is input to speakers 23 and 25.

Thus, control circuit 16 is responsive to signals on outputs 32–35 of audio source 12 to generate respective signals for speakers 18–29. Each output has an associated controlled signal delay and frequency characteristic uniquely generated for the speaker, or speakers, to which it is connected. More particularly, in one reduction to practice the frequency range of the signal for driving speakers 28 and 29 is below 80 Hz, and does not include a signal delay. The signals driving woofers 22 and 23 has a frequency range of 80 Hz to 3,000 Hz, and do not have a signal delay. The signals driving speakers 18–25 have a low frequency cutoff of approximately 150 Hz. The signals thus have a frequency range from 150 Hz up to approximately 20,000 Hz. The signals input to speakers 18 and 20 are delayed 10 milliseconds. The signals input to speaker 19 are delayed 8 milliseconds. The signals input to speakers 21, 23, 24 and 25 are delayed 20 milliseconds. The signals input to speaker 22 are delayed 5 milliseconds.

To assemble the audio system 10 in vehicle 8, speakers 18–25 are connected to headliner 30 using adhesive 52 and 54. Speakers 26 and 27 are mounted to door panels in the vehicle, in a conventional manner. Speakers 28 and 29 are mounted to the rear package tray, also in a conventional manner. Amplifiers 112, 124, 134, 136, 154, 156, 164, 174, 176, 178 and 180 in control circuit 16 are connected to associated ones of speakers 18–25. The balanced outputs of audio source 12 are connected to differential receiver 100 in control circuit 16. The control circuit may be mounted in the trunk of the vehicle. The audio system is thus quickly installed in vehicle 8 without substantial structural modification of the vehicle.

Although the control circuit is mounted in the vehicle trunk in the embodiment of FIGS. 3 and 4, those skilled in the art will recognize that the control circuit may be mounted at other locations in the vehicle. In one particularly advantageous embodiment of the invention, the control circuit 16 is provided in two housings 16A and 16B (FIG. 1). In this embodiment, amplifiers 134, 136, 154, 156, 164, 174, 176, 178 and 180 are supported in housing 16B. Alternatively, additional components of control circuit 16 may be mounted in housing 16B. Housing 16B is mounted to headliner 30 by any suitable means such as using a fastener, an adhesive, or the like. The rest of control circuit 16 is mounted in housing 16A, which is positioned in the box 16A. Housings 16A and 16B in this alternate embodiment are connected by cable, or wire-harness, 17. Housings 16, 16A, and 16B may be provided using any suitable electrical circuit enclosure.

In operation, the signals output from audio source 12 are converted to single ended signals in differential receiver 100. The output of the differential receiver is equalized and amplified in control circuit 16. Speaker 18 positioned near the longitudinal axis $C_L$ of the headliner has a sum of the right and left front signals and speaker 22 has a sum of the right and left rear signals to effect center staging. Speakers 26 and 27 also have a sum of the right and left front speakers for frontal staging. The other overhead speakers 18, 20, 21 and 23–25 have respective left and right rear signals according to the left and right placement of the speakers. Additionally, the signals input to the overhead speakers 16–25 have a controlled delay according to the position of the speaker in the vehicle. This delay, together with placement of the speaker effect synchronization and three-dimensional directionality to define a desired ambiance. The equalization and amplification of the signals for each speaker effects a uniform frequency characteristic for each speaker over the desired frequency range output by each speaker in the system.

The vehicle audio system thus includes speakers positioned near the vehicle roof structure which are driven by a control circuit to produce strong front staging and simulate a listening area larger than that of the vehicle. The speakers are most preferably mounted to the vehicle headliner for ease of installation in, and modification of, a vehicle. The speakers are preferably mounted to the headliner using an adhesive which provides a seal between the speaker and headliner, such that the front and back of the speaker are acoustically separated. Overhead speakers positioned substantially along the longitudinal axis of the vehicle headliner provide front center staging for both front and rear occupants in the vehicle. The overhead speakers spaced along the sides of the roof provide the desired ambient imaging. Thus, the audio system according to the invention provides more effective audio staging and surrounding ambiance than heretofore known vehicle systems.

In the foregoing description, it will be readily perceived by those skilled in the art that modifications may be made without departing from the concepts disclosed herein. For example, six speakers could be mounted to the headliner instead of the eight illustrated by eliminating speakers 24 and 25. If the system is implemented in a pick-up truck, five headliner speakers may be used by eliminating speakers 21–23, and the control circuits therefor. Furthermore, the controlled delay provided to each signal input to the speakers may be varied depending upon the vehicle in which the audio system is utilized. Additionally, those skilled in the art will recognize that speakers could be used in the vehicle and the different frequency response characteristics of these amplifiers could compensate for using equalization complementary to the speaker, and thus the equalization will vary depending upon the speaker selected. Accordingly, all such modifications are to be considered included in the following claims, unless these claims by their language, expressly state otherwise.

The embodiments of the invention in which an exclusive property or privilege is claimed are defined as follows:

1. An audio system for a vehicle including a vehicle roof structure, comprising:

a headliner made of a relatively thin flexible substrate for mounting in a generally horizontal plane to the vehicle roof structure for providing a decorative inner roof cover in the vehicle interior;

a source of audio signals;

a control circuit coupled to said audio source, said control circuit generating left, right and center channel signals;

a first magnetic speaker mounted to said headliner near one edge thereof, said first speaker coupled to said control circuit to receive said right channel signal;

a second magnetic speaker mounted to said headliner near another edge thereof, said second speaker coupled to said control circuit to receive said left channel signal;

a third magnetic speaker mounted to said headliner intermediate said first and second speakers, said third speaker connected to said control circuit to receive said center channel signal;

a fourth magnetic speaker mounted to said headliner near said one edge of said headliner and spaced from said first speaker, said fourth speaker coupled to said control circuit to receive said right channel signal;

a fifth magnetic speaker mounted to said headliner near said another edge of said headliner and spaced from said second speaker, said fifth speaker coupled to said control circuit to receive said left channel signal; and wherein the spacing of said first, second, third, fourth, and fifth speakers on said headliner is selected such that said speakers create a front center staging for occupants of the vehicle while providing a surrounding ambience simulating a listening area substantially larger than that in the interior of a vehicle in response to said signals supplied to said speakers and wherein said first, second, third, fourth and fifth speakers have a major dimension less than about five inches and are mounted directly to said headliner and supported only by said headliner, and wherein said first, second and third speakers are substantially full range speakers reproducing signals in the frequency range between 150 Hz to 15,000 Hz.

2. The audio system as defined in claim 1 further including a low frequency speaker positioned below the headliner of the vehicle.

3. The audio system as defined in claim 1, wherein said third speaker is positioned near the longitudinal centerline of the vehicle adjacent the front edge of the headliner.

4. The audio system as defined in claim 1, further including a sixth speaker positioned near the center of the headliner, said sixth speaker coupled to said control circuit to receive said center channel signal.

5. An audio system for a vehicle including front, rear and side windows comprising:
 a decorative headliner made of a relatively thin and flexible material for extending generally horizontally over the inner surface of the vehicle's roof structure between the front, rear and side windows;
 a source of audio signals, said source generating left, right and center signals;
 a first magnetic speaker having a major dimension less than about five inches and mounted only to said headliner for support of said first speaker and positioned adjacent one side edge of said headliner, said first speaker coupled to said source of audio signals to receive said right signal therefrom;
 a second magnetic speaker having a major dimension less than about five inches and mounted only to said headliner for support of said second speaker and positioned near another side edge of said headliner, said second speaker coupled to said source of audio signals to receive said left signal therefrom;
 a third magnetic speaker having a major dimension less than about five inches and mounted only to said headliner for support of said third speaker and positioned intermediate said one and said another side edges, said intermediate speaker coupled to said audio source to receive said center signal therefrom; and
 at least one fourth speaker positioned in the vehicle below the headliner wherein said first, second and third speakers are full range speakers and said at least one fourth speaker is a woofer or a sub-woofer to provide a full audio frequency range imaging system in a vehicle.

6. The audio system as defined in claim 5 wherein said headliner speakers reproduce sound in the frequency range from approximately 150 Hz to 15,000 Hz.

7. A vehicle headliner and speaker assembly comprising:
 a headliner comprising a flexible substrate shaped for covering the interior roof area of a vehicle and an integral upholstery material on a side of said substrate which faces the interior of the vehicle when said headliner is installed in a vehicle;
 a plurality of magnetic speakers mounted in spaced relationship to said substrate on a side opposite said upholstery material to be supported directly and only by said substrate; and
 means for applying audio frequency signals to said speakers.

8. The audio system as defined in claim 5 for mounting in a vehicle including a front seat and a rear seat, and wherein said first, second and third speakers are mounted to said headliner such that they are positioned forward and above said front seat.

9. The audio system as defined in claim 5 and further including a fifth speaker having a major dimension less than about five inches and mounted only to said headliner for support of said fifth speaker and positioned at approximately the center of said headliner.

10. The audio system as defined in claim 9, and further including sixth and seventh speakers mounted only to said headliner for support of said sixth and seventh speakers and positioned laterally of said fifth speaker, said sixth and seventh speakers each having a major dimension less than about five inches.

11. The audio system as defined in claim 10, and further including eighth and ninth speakers each having a major dimension less than about five inches mounted only to said headliner for support of said eighth and ninth speakers and positioned on said headliner such that they are over and behind the rear seats of the vehicle when the headliner is mounted to the vehicle interior.

12. An audio system for a vehicle including front, rear and side windows comprising:
 a decorative headliner made of a relatively thin and flexible material for extending generally horizontally over the inner surface of the vehicle's roof structure between the front, rear and side windows;
 a source of audio signals, said source generating left, right and center signals;
 a first magnetic speaker having a major dimension less than about five inches and mounted only to said headliner for support of said first speaker adjacent one side edge of said headliner, said first speaker coupled to said source of audio signals to receive said right signal therefrom;
 a second magnetic speaker having a major dimension less than about five inches and mounted only to said headliner for support of said second speaker near another side edge of said headliner, said second speaker coupled to said source of audio signals to receive said left signal therefrom;
 a third magnetic speaker having a major dimension less than about five inches and mounted only to said headliner for support of said third speaker intermediate said one and said another side edges, said intermediate speaker coupled to said audio source to receive said center signal therefrom;
 at least one fourth speaker positioned in the vehicle below the headliner wherein said first, second and third speakers are full range speakers and said at least one fourth speaker is a woofer or a sub-woofer, wherein said headliner speakers reproduce sound in the frequency range from approximately 150 Hz to 15,000 Hz whereby a full audio frequency range imaging system is implemented in a vehicle; and
 a delay circuit coupled between said audio source and said third speaker, said delay circuit imparting a delay to said center signal before it is input to said third speaker.

13. The audio system as defined in claim 12 wherein said headliner includes a substrate and a fabric covering a side of said substrate which faces the interior of the vehicle when the headliner is installed in a vehicle, at least one aperture formed only through said substrate, and wherein at least one of said first, second and third speakers is mounted to said substrate to be supported only by said substrate in alignment with said aperture, and wherein said fabric extends over said aperture and conceals said at least one speaker from view.

14. The audio system as defined in claim 13 wherein said substrate includes at least three apertures formed only through said substrate and said first, second and third speakers are mounted to said substrate in alignment with a respective one of said apertures.

15. An audio system for a vehicle including front, rear and side windows comprising:
- a decorative headliner made of a relatively thin and flexible material for extending generally horizontally over the inner surface of the vehicle's roof structure between the front, rear and side windows;
- a source of audio signals, said source generating left, right and center signals;
- a first magnetic speaker having a major dimension less than about five inches and mounted to said headliner adjacent one side edge of said headliner, said first speaker coupled to said source of audio signals to receive said right signal therefrom;
- a second magnetic speaker having a major dimension less than about five inches and mounted on said headliner near another side edge of said headliner, said second speaker coupled to said source of audio signals to receive said left signal therefrom;
- a third magnetic speaker having a major dimension less than about five inches and mounted on said headliner intermediate said one and said another side edges, said intermediate speaker coupled to said audio source to receive said center signal therefrom;
- at least one fourth speaker positioned in the vehicle below the headliner wherein said first, second and third speakers are full range speakers and said at least one fourth speaker is a woofer or a sub-woofer, whereby a full audio frequency range imaging system is implemented in a vehicle;
- a fifth magnetic speaker having a major dimension less than about five inches and positioned at approximately the center of said headliner;
- sixth and seventh magnetic speakers positioned laterally of said fifth speaker, said sixth and seventh speakers each having a major dimension less than about five inches;
- eighth and ninth magnetic speakers each having a major dimension less than about five inches mounted to said headliner and positioned on said headliner such that they are over and behind the rear seats of the vehicle when the headliner is mounted to the vehicle interior; and
- a time delay circuit delaying the signal applied to at least said third, fifth, sixth and seventh speakers.

16. The audio system as defined in claim 15, wherein said fourth speaker includes a woofer and a sub-woofer.

17. A vehicle headliner and speaker assembly comprising:
- a substrate of relatively thin flexible material, said substrate shaped to define a headliner for substantially covering the interior roof area of a vehicle;
- a decorative surface integrally formed on a side of said substrate which faces the interior of the vehicle when the headliner is installed in a vehicle;
- a plurality of apertures formed at least through said substrate in spaced relationship to one another; and
- a plurality of speakers mounted directly and only to said substrate with one speaker in alignment with each of said plurality of apertures, said speakers having a major dimension less than about five inches.

18. The headliner as defined in claim 17 including at least three apertures with a first one of said apertures located along the longitudinal centerline of said substrate and second and third apertures located near opposite edges of said substrate.

19. The headliner as defined in claim 18 and further including fourth and fifth apertures formed in said substrate at opposite edges of said substrate and spaced in remote relationship to said second and third apertures.

20. The headliner as defined in claim 17 wherein said decorative surface comprises a decorative material and wherein said apertures extend only through said substrate and are covered by said decorative material.

21. A vehicle headliner and speaker assembly comprising:
- a substrate of relatively thin flexible material, said substrate shaped to define a headliner for substantially covering the interior roof area of a vehicle;
- a decorative surface integrally formed on a side of said substrate which faces the interior of the vehicle when the headliner is installed in a vehicle;
- a plurality of apertures formed at least through said substrate in spaced relationship to one another; and
- a plurality of speakers mounted directly and only to said substrate with one speaker in alignment with each of said plurality of apertures, said speakers having a major dimension less than about five inches, wherein said substrate includes three apertures with a first one of said apertures located along the longitudinal centerline of said substrate and second and third apertures located near opposite edges of said substrate, and further including fourth and fifth apertures formed in said substrate at opposite edges of said substrate and spaced in remote relationship to said second and third apertures, and further including sixth, seventh and eighth apertures formed in said substrate and positioned between said first, second, and third apertures and said fourth and fifth apertures, said sixth, seventh and eighth apertures aligned in spaced relationship transversely across said substrate.

22. A vehicle headliner and speaker assembly comprising:
- a relatively thin flexible substrate defining the shape of a headliner for covering the interior roof area of a vehicle;
- an upholstery material integrally covering a side of said substrate which faces the interior of the vehicle when the headliner defined by said substrate and said upholstery material is installed in a vehicle;
- at least one aperture formed only through said substrate; and
- a speaker mounted to said substrate to be supported only by said substrate, said speaker aligned with said aperture, and wherein said upholstery material extends over said aperture and conceals said speaker from view.

23. The headliner as defined in claim 22 wherein said substrate includes a plurality of apertures formed only through said substrate and further including a plurality of speakers mounted to said substrate in alignment with each of said apertures.

24. An audio system for a vehicle comprising:
- a decorative headliner for mounting to a vehicle roof, said headliner including a flexible substrate of acoustical damping material having a side integrally covered with an upholstery material and facing the interior of the vehicle for providing a decorative appearance to said headliner, said headliner including a plurality of spaced speaker apertures;
- a plurality of magnetic speakers mounted directly and only to said headliner to be supported by said headliner with a speaker aligned with each aperture and mounted on a first side of said headliner to position said speakers behind said headliner when said headliner is installed; and an electrical circuit coupled to said speakers for providing audio frequency signals for said speakers.

25. The audio system as defined in claim 24 wherein said apertures extend only through said substrate and said headliner includes a covering on a second side opposite said first side for covering said apertures and said second side.

26. The audio system as defined in claim 24 wherein said speakers have a major dimension of less than about five inches.

27. A vehicle headliner for covering the interior of a metallic roof of a vehicle, said headliner comprising:
   a relatively thin flexible substrate defining the shape of a decorative headliner for a vehicle;
   at least one aperture formed in said substrate; and
   a speaker secured to said substrate to be supported only by said substrate, said speaker aligned with said aperture, wherein said speaker includes a magnet and said speaker is positioned on said substrate such that said magnet is magnetically attracted to the vehicle roof for assisting in attaching said headliner to the vehicle roof.

28. The headliner as defined in claim 27 including a plurality of spaced apertures and a plurality of speakers with one speaker mounted to said substrate in alignment with each of said plurality of apertures.

29. A vehicle headliner for covering the interior of a metallic roof of a vehicle, said headliner comprising:
   a relatively thin flexible substrate defining the shape of a decorative headliner for a vehicle;
   at least one aperture formed in said substrate; and
   a speaker secured to said substrate to be supported only by said substrate, said speaker aligned with said aperture, wherein said speaker includes a magnet and said speaker is positioned on said substrate such that said magnet is magnetically attracted to the vehicle roof for assisting in attaching said headliner to the vehicle roof, and further including a spacer positioned over said magnet and extending between said magnet and the vehicle roof once said headliner is installed.

30. The headliner as defined in claim 29 wherein said spacer is made of a foam material.

31. An audio system for a vehicle including front, rear and side windows comprising:
   a decorative headliner made of a relatively thin and flexible material for extending generally horizontally over the inner surface of the vehicle's roof structure between the front, rear and side windows;
   a source of audio signals, said source generating left, right and center signals;
   a first speaker having a major dimension less than about five inches and mounted to said headliner adjacent one side edge of said headliner, said first speaker coupled to said source of audio signals to receive said right signal therefrom;
   a second speaker having a major dimension less than about five inches and mounted on said headliner near another side edge of said headliner, said second speaker coupled to said source of audio signals to receive said left signal therefrom;
   a third speaker having a major dimension less than about five inches and mounted on said headliner intermediate said one and said another side edges, said intermediate speaker coupled to said audio source to receive said center signal therefrom, wherein said headliner includes a substrate and at least one aperture formed in said substrate, and wherein at least one of said first, second and third speakers is secured to said substrate to be supported only by said substrate, said at least one speaker aligned with said aperture and including a magnet with said at least one speaker positioned on said substrate such that said magnet is magnetically attracted to the vehicle roof for assisting in attaching said headliner to the vehicle roof;
   at least one fourth speaker positioned in the vehicle below the headliner wherein said first, second and third speakers are full range speakers and said at least one fourth speaker is a woofer or a sub-woofer, wherein said headliner speakers reproduce sound in the frequency range from approximately 150 Hz to 15,000 Hz whereby a full audio frequency range imaging system is implemented in a vehicle; and
   a delay circuit coupled between said audio source and said third speaker, said delay circuit imparting a delay to said center signal before it is input to said third speaker.

32. The audio system as defined in claim 31 and further including a spacer positioned over said magnet and extending between said magnet and the vehicle roof once said headliner is installed.

33. The audio system as defined in claim 32 wherein said spacer is made of a foam material.

34. An audio system for a vehicle, said system including a headliner speaker assembly, said system comprising:
   a decorative headliner made of a relatively thin and flexible material for extending generally horizontally over the inner surface of the vehicle's roof structure between the front, rear and side windows;
   a source of audio signals, said source providing multiple channels of signal information;
   a plurality of magnetic speakers mounted directly to said headliner and supported only by said headliner at spaced locations thereon, said speakers coupled to said source;
   at least one speaker positioned in the vehicle below the headliner and coupled to said source for reproducing lower frequency sound; and
   a delay circuit coupled between said audio source and at least one of said plurality of speakers.

35. A vehicle headliner and speaker assembly comprising:
   a headliner comprising a flexible substrate shaped for substantially covering the interior roof area of a vehicle and an integral decorative surface on a side of said substrate which faces the interior of the vehicle when said headliner is installed in a vehicle; and
   a magnetic speaker mounted to said substrate on a side opposite said decorative surface to be supported only by said substrate.

36. The assembly as defined in claim 35 and further including a plurality of speakers mounted in spaced relationship to said substrate.

37. The assembly as defined in claim 35 wherein said decorative surface comprises an upholstery material.

38. The assembly as defined in claim 37 wherein said upholstery material comprises a fabric.

39. The assembly as defined in claim 35 wherein said substrate includes an aperture extending therethrough and said speaker is aligned with said aperture.

40. The assembly as defined in claim 39 wherein said decorative surface comprises an upholstery material and wherein said aperture extends only through said substrate such that said upholstery material covers said speaker.

41. The assembly as defined in claim 35 and further including a source of audio frequency signals coupled to said speaker.

* * * * *